United States Patent
Macht et al.

(10) Patent No.: US 10,385,966 B2
(45) Date of Patent: Aug. 20, 2019

(54) HYDRAULIC ACTUATING DEVICE FOR ACTUATION OF SETTING ELEMENTS IN A MOTOR VEHICLE TRANSMISSION

(71) Applicant: FTE automotive GmbH, Ebern (DE)

(72) Inventors: Egid Macht, München (DE); Roland Stössel, Oberaurach (DE); Reinhold Stöhr, Ebern (DE); Karin Fecke, Bad Königshofen (DE); Dietmar Fuchs, Föritz (DE); Alexander Reul, Frensdorf (DE); Wilhelm Will, Rudendorf (DE); Christian Voigt, Ebern (DE); Wilhelm Heubner, Itzgrund (DE)

(73) Assignee: FTE automotive GmbH, Ebern (DE)

( * ) Notice: Subject to any disclaimer, the term of this patent is extended or adjusted under 35 U.S.C. 154(b) by 331 days.

(21) Appl. No.: 15/328,700

(22) PCT Filed: Jul. 23, 2015

(86) PCT No.: PCT/EP2015/001512
§ 371 (c)(1),
(2) Date: Jan. 24, 2017

(87) PCT Pub. No.: WO2016/015844
PCT Pub. Date: Feb. 4, 2016

(65) Prior Publication Data
US 2017/0211693 A1    Jul. 27, 2017

(30) Foreign Application Priority Data
Jul. 31, 2014   (DE) .................. 10 2014 011 176

(51) Int. Cl.
*F16H 59/00*   (2006.01)
*F16H 61/00*   (2006.01)
(Continued)

(52) U.S. Cl.
CPC ......... *F16H 61/30* (2013.01); *F16H 61/0006* (2013.01); *F16H 61/0009* (2013.01);
(Continued)

(58) Field of Classification Search
CPC . F16H 61/30; F16H 63/3023; F16H 2061/308
See application file for complete search history.

(56) References Cited

U.S. PATENT DOCUMENTS 5,417,124 A * 5/1995 Huff .................... F16H 61/0003
74/335
5,845,544 A * 12/1998 Huggins ................ F16H 3/095
74/606 R (Continued)

FOREIGN PATENT DOCUMENTS

CN      202001600       10/2011
DE      10342389 A1     4/2005
(Continued)

OTHER PUBLICATIONS

Chinese Office Action, Applicant: FTE automotive GmbH, Application No. 201560052166.6, dated Jan. 26, 2018, 11 pages.
(Continued)

*Primary Examiner* — Jake Cook
(74) *Attorney, Agent, or Firm* — Reising Ethington, P.C.

(57) ABSTRACT

A hydraulic operating device for operating actuators in a motor vehicle transmission has at least two actuation cylinders each containing a cylinder housing. An actuation piston is guided therein along a cylinder axis in a longitudinally displaceable manner. Each actuation piston can be hydraulically loaded and is operatively connected to one of the actuators. The actuation cylinders are combined into a unit that can be flange-mounted on one side, via a flange face, to a dividing wall of a transmission housing of the motor vehicle transmission. The cylinder housings are injec-
(Continued)

tion molded from plastic integrally with a flange plate that runs transversely to the cylinder axes, the flange face being formed on the flange plate. The cylinder housings protrude beyond the flange plate, at least on the side of the flange face, in the direction of the cylinder axes.

20 Claims, 10 Drawing Sheets

(51) Int. Cl.
    *F16H 63/00*     (2006.01)
    *F16H 61/30*     (2006.01)
    *F16H 63/30*     (2006.01)

(52) U.S. Cl.
    CPC ... *F16H 63/3023* (2013.01); *F16H 2061/308* (2013.01); *F16H 2063/005* (2013.01)

(56) References Cited

U.S. PATENT DOCUMENTS

| | | | |
|---|---|---|---|
| 7,644,647 B2 | 1/2010 | Reul et al. | |
| 7,942,252 B2 | 5/2011 | Schntzer | |
| 7,950,323 B2 * | 5/2011 | Kauffeldt | F16H 63/3023 92/140 |
| 8,051,734 B2 | 11/2011 | Schnitzer | |
| 8,156,837 B2 | 4/2012 | Smith | |
| 8,250,967 B2 | 8/2012 | Beattie, Jr. | |
| 8,939,268 B2 | 1/2015 | Heubner | |
| 9,476,431 B2 | 10/2016 | Heubner et al. | |
| 9,748,040 B2 | 8/2017 | Reisch et al. | |
| 9,803,702 B2 | 10/2017 | Heubner | |
| 2011/0048363 A1* | 3/2011 | Gronau | F15B 15/1447 123/193.6 |
| 2014/0239737 A1 | 8/2014 | Reisch et al. | |

FOREIGN PATENT DOCUMENTS

| | | |
|---|---|---|
| EP | 1515069 | 3/2005 |
| WO | WO2014/195145 A1 | 12/2014 |

OTHER PUBLICATIONS

International Preliminary Report on Patentability, Application No. PCT/EP2015/001512; Filing Date Jul. 23, 2015; Applicant FTE Automotive GmbH; 11 pages.

German Office Action; Appliant: FTE automotive GmbH; Application No. 10 2014 011 176.8; dated Apr. 28, 2015; 5 pages.

* cited by examiner

HYDRAULIC ACTUATING DEVICE FOR ACTUATION OF SETTING ELEMENTS IN A MOTOR VEHICLE TRANSMISSION

TECHNICAL FIELD

The present invention relates to a hydraulic actuating device for actuation of setting elements in a motor vehicle transmission.

Actuating devices for actuation of setting elements in a motor vehicle transmission are in widespread use for, for example, automatic transmissions in the automobile industry. These devices are also referred to as "gear selectors" and serve the purpose of, for example, actuation, i.e. displacing and optionally positioning, of selector forks, which are attached to selector rods of the transmission, for gear changing.

BACKGROUND OF THE INVENTION

Document DE 103 42 389 A1 discloses hydraulic control equipment for a transmission, having a total of four actuating cylinders (actuator cylinder units or hydraulic cylinder units), having a cylinder housing (main unit with respective cylinder chambers) and actuating pistons (pistons), which are guided therein to be longitudinally displaceable along cylinder axes and which can each be acted on hydraulically and are operatively connected with one of the setting elements (selector rods with selector forks) of the transmission. The actuating cylinders are already combined in assembly-friendly manner into a subassembly which can be flange-mounted by way of a flange surface from one side on a casing partition wall of the transmission.

A disadvantage of this prior art is however to be seen in the fact that the previously known substantially block-shaped subassembly demands a relatively large amount of installation space in the direction of the cylinder axes and is also comparatively heavy in its bulky metallic form. However, the available installation space at or in the transmission casing is usually very tightly dimensioned. Moreover, a weight reduction is desirable particularly with respect to issue of the fuel consumption in the context of use in modern motor vehicles.

What is desired is creating a lightest possible hydraulic actuating device for actuation of setting elements in a motor vehicle transmission, which avoids the above disadvantages and by comparison with the mentioned prior art has, in particular, a reduced installation space retirement.

SUMMARY OF THE INVENTION

According to one aspect of the invention, in a hydraulic actuating device for actuation of setting elements in a motor vehicle transmission—which device comprises at least two actuating cylinders having a cylinder housing and an actuating piston guided therein to be longitudinally displaceable along a cylinder axis and which can be hydraulically loaded and is operatively connected with one of the setting elements. The actuating cylinders are combined to form a unit which can be flange-mounted by way of a flange surface from one side on a partition wall of a transmission casing of the motor vehicle transmission. The cylinder housings of the actuating cylinders are injection-molded integrally with a flange plate of plastic material which extends transversely to the cylinder axes and at which the flange surface is formed, wherein the cylinder housings protrude beyond the flange plate in the direction of the cylinder axes at least on the side of the flange surface.

In other words, each actuating cylinder has its own cylinder housing, wherein all cylinder housings are connected together merely by way of the flange plate constructed integrally in terms of material with the cylinder housings. By comparison with the block design disclosed in the prior art defining the genre, further "intermediate material" between the cylinder housings is avoided. This leads, with respect to construction from plastic material, to a very light actuating device which, in addition, can also be produced very economically by injection-molding, wherein the material-removing processing steps, which are required in the prior art defining the genre, and the cost connected therewith are eliminated. Due to the fact that, in addition, the cylinder housings as seen in the direction of the cylinder axes protrude beyond the flange plate at least on the side of the flange surface so that the cylinder housings in the state of the actuating device being mounted on or in the motor vehicle transmission project at least partly into the transmission casing and in that case pass through associated openings in the transmission casing partition wall on which the actuating device is flange-mounted, use is also made of, in particular, the wall thickness of the transmission casing partition wall as an axial installation space for the actuating cylinders. As a result the entire arrangement is of particularly compact construction. Moreover, the installation space here gained in the transmission casing partition wall can advantageously be used for protective reception of sensors, cables, etc., optionally present at the outer circumference of the cylinder housings.

In an advantageous embodiment of the actuating device the flange plate can be provided with a plurality of mounting holes, which are distributed over the circumference and extend perpendicularly to the flange surface and which are lined with support sleeves provided on a side remote from the flange surface with a tensioning collar for fastening screws, which extend through the support sleeves and, for mounting of the actuating device, can be screwed into associated threaded bores of the partition wall of the transmission casing so as to draw the flange surface against the partition wall. Force transmission thus takes place here by way of the preferably metallic support sleeves so that the plastic material of the flange plate cannot be overloaded. The support sleeves can be placed in simple manner into the injection-molding mold and then encapsulated by injection-molding or, after the injection-molding process, pressed into the thus-formed continuous mounting holes in the flange plate.

In that case, the mounting holes furthest apart from one another can form a fixed bearing mounting hole and a movable bearing hole at which the support sleeves protrude by centering projections beyond the flange surface for mechanically positive engagement in associated centering recesses in the partition wall of the transmission casing, while the remaining support sleeves end in front of or at the flange surface. The fixed bearing mounting hole surrounds the associated support sleeve free of play, but the movable bearing mounting hole is formed as an oblong hole which is aligned with the fixed bearing mounting hole and in which the associated support sleeve is movably received in correspondence with the alignment of the oblong hole so that compensation can be provided for spacing tolerances. To that extent the injection-molded part can in relative terms be subject to tolerances without this being detrimental to correct mounting. Moreover, compensation can be readily provided for any dimensional and positional tolerances i.e. spacing of the centering recesses in the partition wall of the transmission casing.

In a further, preferred embodiment of the mounting situation the flange plate can be provided on the side, which is remote from the flange surface, around the movable bearing mounting hole with a chamfer which allows deflection of the tensioning collar at the support sleeve associated with the movable bearing mounting hole before the sleeve comes into contact with an end surface at an abutment surface provided in the associated centering recess. It is thus possible to resiliently "bridge over" axial tolerances in simple manner so that compensation can be easily provided for, for example, thickness tolerances of the flange plate and/or tolerances in the depth of the corresponding centering recess in the partition wall of the transmission casing.

Insofar as the flange plate of the actuating device also has to have a media-separating function, it is in principle possible to provide at the flange surface a molded seal in order to seal off one side of the flange plate relative to the associated surface at the transmission casing. However, in order provide such a sealing function it is preferred if the flange plate is provided in the region of the flange surface with an encircling depression, which is readily producible by injection molding, for reception of a flange seal. The flange seal is formed in two layers from a resilient sealing material, for example ACM (elastomer on the basis of acrylate rubber) and has a wider base section, which serves as a captive anchorage at the flange plate, and a thinner sealing section, which is arranged on the base section and which protrudes beyond the flange surface. A seal of that kind can be easily coated or applied by automated needle dosing in which the dosing needle is moved in a continuous movement over the flange surface and in that case continuously meters initially viscous sealing material, wherein in a first step the wider base section for the securing function and in a second step the thinner sealing section for producing the sealing function are applied precisely and reproducibly. The assembly cost connected with a molded seal is thus avoided.

In principle, it is possible to form the individual cylinder housings of the actuating device to be "closed" and to provide them with pressure connections by way of which the actuating pistons can be acted on hydraulically. In further pursuit of the concept of the invention it is nevertheless preferred if each cylinder housing has a cylinder chamber section for reception of the respective actuating piston and a pressure connecting section which extends parallel to the cylinder chamber section and is in fluid connection behind the actuating piston with the cylinder chamber section, the sections being provided at the open ends thereof spaced from the flange surface with a respective pressure seal which seals relative to the partition wall of the transmission casing so that the actuating piston can be loaded with pressure on one side thereof by way of the open end of the cylinder chamber section and on the other side thereof by way of the open end of the pressure connecting section. Use is thus made of walls or wall surfaces, which are present in any case, in the transmission casing for bounding the hydraulic sections, which is advantageous with respect to the installation space requirement of the actuating device and with respect to cost.

In that case, the cylinder chamber and pressure connecting sections can be provided at the open ends thereof with a respective annular recess for reception of the associated pressure seal, which is constructed to amplify the sealing effect under pressure loading. The pressure seal has an annular base body which is either provided on both longitudinal sides with a sealing lip sealing in axial direction under radial pressure loading or provided on one longitudinal side with a sealing bead protruding beyond the respective open end. On the other longitudinal side a radially acting sealing lip is provided which together with a base body projection bounds an annular chamber which can be loaded with pressure via radially extending passages in the base body projection so as to press the pressure seal by the sealing bead thereof in piston-like manner against the partition wall. Advantageously, compensation for axial tolerances can be provided by these two sealing variants and any deformations of the mounted flange plate "bridged over".

In a further sealing variant at least the pressure seals at the open ends of the cylinder chamber section and the pressure connecting section of each cylinder housing can be combined to form a shaped seal which is constructed to be able to be plugged onto the open ends. By comparison with individual seals, this sealing variant has the advantage of simplification of assembly.

In principle, it is conceivable to suitably guide the setting elements, for example the selector rods, which are operatively connected with the actuating pistons, solely in the transmission casing or the walls thereof. Conversely, however, it is preferred if each cylinder housing is provided at an end, which protrudes beyond the flange plate on the side remote from the flange surface, with a housing projection for reception of a guide bushing in which a piston rod connected with the respective actuating piston is guided so that the actuating device also has a guiding or bearing function for the setting elements. In this case, the selector rods can, for example, be constructed simply as a tube or provided with a tubular end into which the piston rod is inserted.

Insofar as the actuating device shall also have a media-separating function, and for improvement of the pressure build-up behavior at the time of hydraulic loading of the actuating piston on the piston-rod side, a rod seal co-operating with the piston rod and connected in axial direction with the guide bushing can also be received in the housing projection, wherein advantageously an annular cover mounted on the housing projection secures not only the guide bushing, but also the rod seal in the housing projection.

In a particularly preferred embodiment of the actuating device a sensor for positional detection of a signal element mounted on the respective actuating piston can be associated with each cylinder housing, wherein an electrical interface, which is in signal connection with the sensors and by way of which the sensors can be contacted in common, is integrated in the unit. The actuating device as such thus already carries the sensor system which may be needed for detection of the actuating movements which are produced. At the time of assembly of the actuating device it is merely necessary to connect the transmission control with the electrical interface of the actuating device. The mounting, which is usual in the prior art, of individual signal elements and sensors on the setting elements (selector rods/selector forks) or in the transmission casing and the wiring thereof can advantageously be eliminated. Apart from this significant simplification of assembly and contact-making, the sensor system can thus also be pre-tested and optionally pre-programmed even before mounting of the actuating device.

With respect to an even higher level of integration of functions in one and the same unit an embodiment of the actuating device is additionally preferred in which at least one sensor for rotational speed sensing at the motor vehicle transmission and/or a connection for such a sensor is or are integrated in the unit and disposed in signal connection with the electrical interface for the common contact-making.

In a particularly compact and assembly-friendly construction of the sensed actuating device the sensors, optionally the terminal for the rotational speed sensor and the interface can be in signal connection by way of a flexible circuit board which is placed on the side, which is to be specially protected in the transmission casing, of the flange surface of the unit so as to follow the external contour of the cylinder housing without problems.

In that case, each cylinder housing can have at the outer circumferential side a receiving recess for the associated sensor, in which case the flexible circuit board on one side is equipped with the sensors and on the other side carries, in the region of the sensors, covers which serve the purpose of protectively closing the receiving recesses with the sensors received therein. A subassembly pre-equipped in that way is particularly simple to mount; subsequent electrical connecting of the individual components is eliminated.

The same applies to an alternative variant, which is even better protected relative to environmental influences such as moisture, temperature and operating media, of the sensed actuating device in which each cylinder housing has at the outer circumferential side a receiving section, which is laterally bounded by two parallel and mutually facing longitudinal grooves, for the associated sensor. Each sensor fitted to the flexible circuit board is surrounded on one and the same side of the flexible circuit board by a frame which is encapsulated together with the respective sensor and the flexible circuit board by a sealing material and has on mutually remote sides two parallel webs which extend transversely to the flexible circuit board and which are insertable into the longitudinal grooves at the receiving section of the respective cylinder housing so as to fix the associated sensor.

In addition, in case of the sensed actuating device, tongues for holding and guiding the flexible circuit board can be integrally formed on the flange plate near the cylinder housings, which not only represents a particularly simple form of positioning and fixing the flexible circuit board, but can also be produced in problem-free manner at a time of injection-molding from plastic material.

Finally, it is in principle possible with the sensed actuating device to use magnets, which are suitably clipped in place at the actuating pistons, as signal elements. With respect to fastening security, however, an embodiment is preferred in which each actuating piston is provided with a sensing projection on which a magnet as a signal element is mounted by injection-molded plastic material encapsulation.

BRIEF DESCRIPTION OF THE DRAWINGS

The invention is explained in more detail on the basis of preferred embodiments with reference to the accompanying, partly schematic drawings, in which for simplification of the illustration elastomeric or elastic parts are illustrated in the undeformed state and in which.

Whereas FIGS. 1 to 13 illustrate a preferred embodiment of the invention, FIGS. 14 to 20 show variants of the pressure seals and alternatives of the sensor system with respect to further embodiments. In all drawings—and in the following description—a more detailed illustration or explanation of the transmission setting elements to be operated (for example, selector rods with selector forks) has been dispensed with because these elements and the function thereof are sufficiently well-known to the expert and explanations with respect thereto appear unnecessary for an understanding of the present invention.

DETAILED DESCRIPTION OF THE EMBODIMENTS

In the figures, the reference numeral 10 generally denotes a hydraulic actuating device for the actuation of setting elements, for example selector rods 12 (indicated in FIG. 5) with selector forks (not shown), in a motor vehicle transmission, of which parts of the transmission casing 14 can be seen in FIGS. 3 to 9. The actuating device 10 comprises at least two, in the illustrated embodiments four, actuating cylinders 16 which each comprise a cylinder housing 18 and an actuating piston 22, which is guided therein to be longitudinally displaceable along a cylinder axis 20 and which can be hydraulically loaded on both sides and is operatively connected with one of the setting elements in a manner still to be described.

The actuating cylinders 16 are combined in a special manner to form a unit which can be flange-mounted by way of a flange surface 24 from one side on a partition wall 26 of the transmission casing 14 and, in particular, the cylinder housings 18 of the actuating cylinders 16 are injection-molded from a plastic material, for example polyphthalamide (PPA) with a predetermined glass-fiber component of, for example 50%, integrally with a flange plate 28, which extends transversely to the cylinder axes 20 and at which the flange surface 24 is formed. In that regard, the cylinder housings 18 project in the direction of the cylinder axes 20 at least on the side of the flange surface 24 beyond the flange plate 28, as can be seen particularly in FIGS. 2, 5, 13, 18 and 19, so that the cylinder housings 18 in the mounted state of the actuating device 10 are partly "recessed" in or "penetrate" into the partition wall 26 of the transmission casing 14 (cf. FIG. 5).

As will similarly be described in more detail in the following, a sensor 30 (see FIGS. 5 and 15 to 17) for positional detection of a signal element 32 mounted on the respective actuating piston 22 is associated with each cylinder housing 18 of the actuating device 10, wherein an electrical interface 34 (cf. FIGS. 2, 10 and 15) which is in signal connection with the sensors 30 and by way of which the sensors 30 can be contacted in common is integrated in the unit.

For mounting the actuating device 10 to or in the transmission casing 14 the flange plate 28 is provided with a plurality of—in the illustrated embodiment a total of seven—mounting holes 36, 36', 36", which are distributed over the circumference at the flange plate edge and extend perpendicularly to the flange surface 24 and details with respect to which can be inferred from FIGS. 4, 8, 9, 11 and 12. Accordingly, each mounting hole 36, 36', 36" is lined by a metallic support sleeve 38, 38', 38" which is provided on a side remote from the flange surface 24 with a tensioning collar 40, 40', 40" for a fastening screw 42, 42', 42", which extends with radial play through the respective support sleeve 38, 38', 38" and which in the mounted state of the actuating device 10 is screwed into an associated threaded bore 44, 44', 44" (cf. FIGS. 4, 8 and 9) of the partition wall 26 of the transmission casing 14 in order to tighten the flange surface 24 of the flange plate 28 against the partition wall 26.

Figure 4:
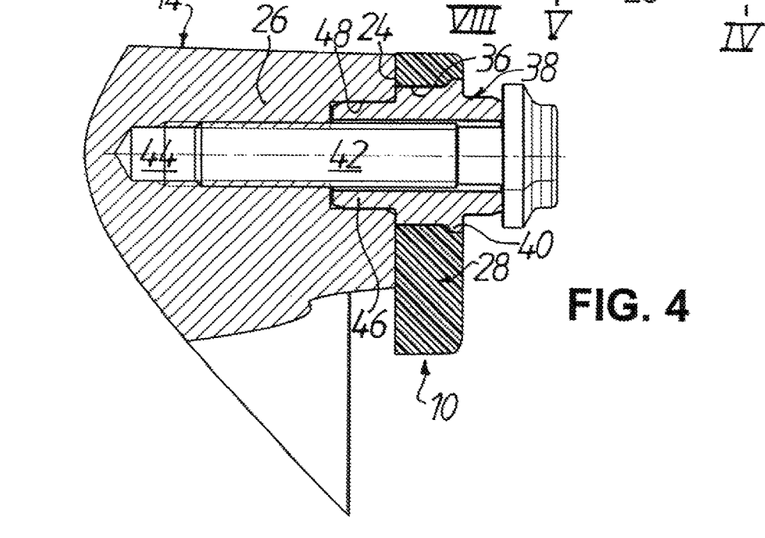
FIG. 4 shows a broken-away sectional view to enlarged scale of the actuating device according to FIG. 1 in mounted state in correspondence with the section line IV-IV in FIG. 3, for illustration of a fixed bearing mounting point of the actuating device at the transmission casing.
Figure 9:
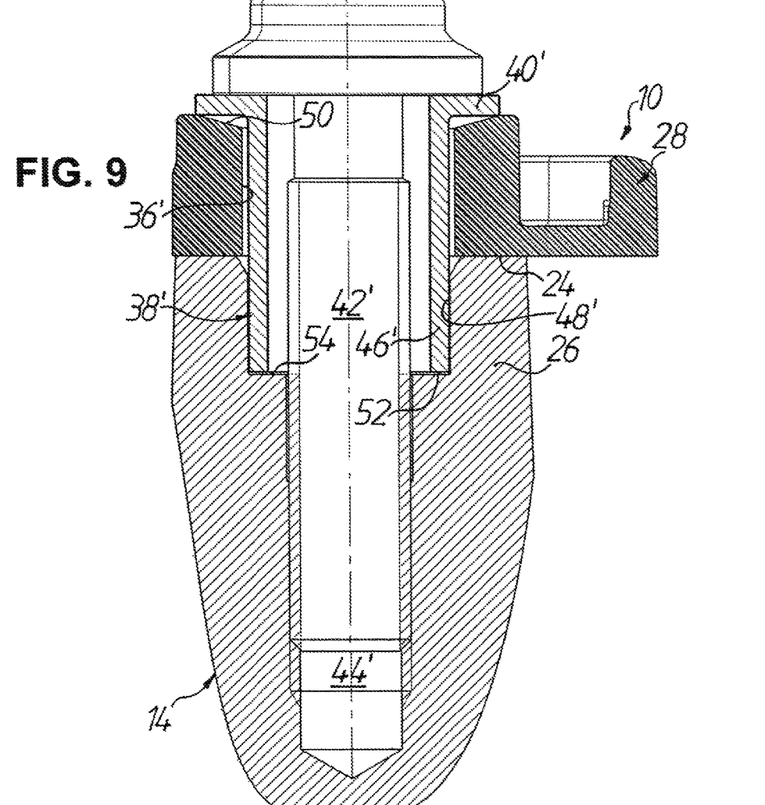
FIG. 9 shows a broken-away sectional view to enlarged scale of the actuating device according to FIG. 1 in mounted state in correspondence with the section line IX-IX in FIG. 3, for illustration of a movable bearing mounting point of the actuating device at the transmission casing.
Figures 10, 11, 12:
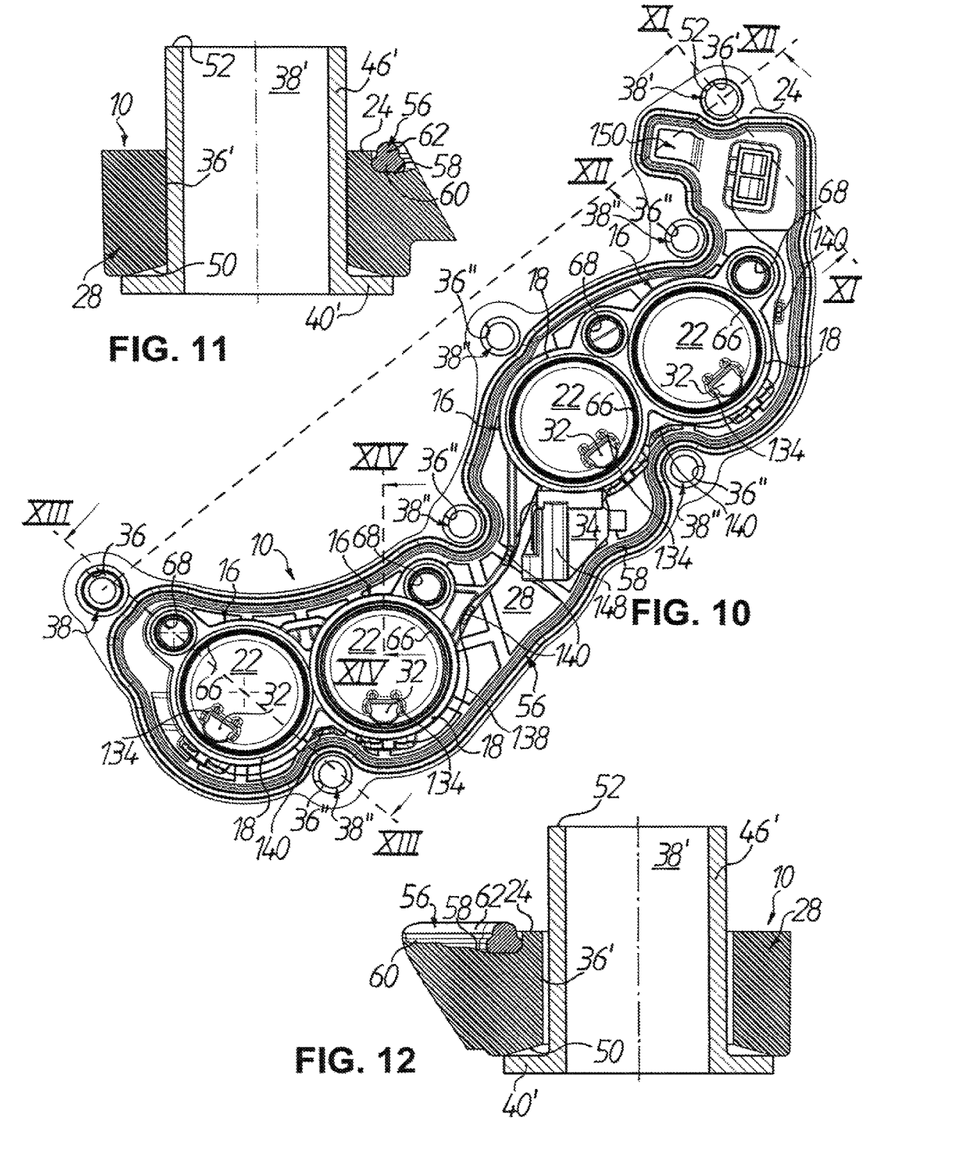
FIG. 10 shows a rear view, which is of reduced size by comparison with the scale of FIG. 1, of the actuating device according to FIG. 1 in non-mounted state with a viewing direction perpendicular to the flange surface.
FIG. 11 shows a broken-away sectional view to enlarged scale of the actuating device according to FIG. 1 in correspondence with the section line XI-XI in FIG. 10, for further illustration of the movable bearing mounting point of the actuating device.
FIG. 12 shows a broken-away sectional view to enlarged scale of the actuating device according to FIG. 1 in correspondence with the section line XII-XII in FIG. 10 perpendicular to the section line XI-XI, wherein the movable bearing mounting point of the actuating device is shown sectioned in a plane extending centrally through the fixed bearing mounting point of the actuating device (see the dashed elongated section line)

In that case, the mounting holes furthest apart from one another as seen in the plane of the flange surface 24 form a fixed bearing mounting hole 36 and a movable bearing mounting hole 36', at which the support sleeves 38, 38' project beyond the flange surface 24 by centering projections 46, 46' for mechanically positive engagement in associated centering recesses 48, 48' in the partition wall 26 of the transmission casing 14 (see FIGS. 4 and 9). Whereas the fixed bearing mounting hole 36 surrounds the associated support sleeve 38 free of radial play, which sleeve can be embedded in the plastic material already at the time of injection-molding of the flange plate 28, the movable bearing mounting hole 36' according to FIGS. 10 and 12 is formed as an oblong hole which is aligned with the fixed bearing mounting hole 36 and in which the associated support sleeve 38' is received to be movable in correspondence with the alignment of the oblong hole, so that compensation can be provided for spacing tolerances. By contrast, the remaining five support sleeves 38" end exactly at the flange surface 24 or shortly in front thereof (cf. FIG. 8) and can be embedded in the plastic material similarly free of radial play at the time of injection-molding of the flange plate 28.

A further feature of the movable bearing mounting situation is similarly shown in FIGS. 9, 11 and 12: the flange plate 28 is provided on the side remote from the flange surface 24 and around the movable bearing mounting hole 36' with, in particular, a chamfer 50 which allows slight deflection of the tensioning collar 40' at the support sleeve 38', which is associated with the movable bearing mounting hole 36', before that sleeve comes into contact by an annular end surface 52 with an annular abutment surface 54 provided in the associated centering recess 48'. For simplification of the illustration, the state directly before deflection of the tensioning collar 40' is shown in FIG. 9. The flow of force is thus divided up starting from the head of the fastening screw 42': a part of the tightening force goes directly via the sleeve section of the support sleeve 38' and the mutually contacting surfaces 52, 54 into the partition wall 26 of the transmission casing 14 and the other part of the tightening force is conducted by way of the tensioning collar 40', which acts in the manner of a plate spring, into the flange plate 28 and presses the latter by the flange surface 24 free of play against the opposing surface at the partition wall 26 of the transmission casing 14.

A flange seal 56 is provided for sealing between the flange plate 28 of the actuating device 10 and the partition wall 26 of the transmission casing 14. More precisely, as FIGS. 2, 5, 7, 8, 10 to 13, 18 and 19 in particular show, the flange plate 28 is provided in the region of the flange surface 24 between or "within" the mounting holes 36, 36', 36" and around the cylinder housings 18 with an encircling depression 58 for reception of the flange seal 56. In the illustrated embodiment the latter is made from a resilient sealing material such as, for example, ACM (elastomer on the basis of acrylate rubber) which prior to hardening is applied in highly viscous form in two directly successive layers by needle dosing, wherein the dosing needle is moved continuously over the flange surface 24 to follow the course of the depression 58. In that case, in a first step initially a wider base section 60 serving as a captive anchorage at the flange plate 28 is produced, onto which a thinner sealing section 62 is then coated in a second step. The thinner sealing section 62, as can be seen particularly in FIGS. 7, 8, 11 to 13 and 19, protrudes beyond the flange surface 24 in the finished, hardened state of the flange seal 56 so that the seal in the mounted state of the actuating device 10 is sealingly pressed under resilient deformation against the opposing surface at the partition wall 26 of the transmission casing 14, which, however, for simplification of the illustration is not shown in FIGS. 5, 7 and 8. Media separation by the actuating device 10 is possible in this way: thus, it is possible to operate on the control side of the partition wall 26 on the left in FIG. 5, on which also clutches, valves, etc., can be disposed (not shown), with a hydraulic oil different from on the transmission side of the partition wall 26 on the right in FIG. 5, where the gearwheel sets (not illustrated) are arranged. According to, in particular, FIGS. 1, 2 and 18 the flange plate 28 is otherwise suitably stiffened between the mounting holes 36, 36', 36" and the cylinder housings 18 on the front side and the rear side by ribs against excessive deformations detracting from flange tightness, as characterized in the mentioned figures by way of example by 64.

Figures 5, 6, 7:
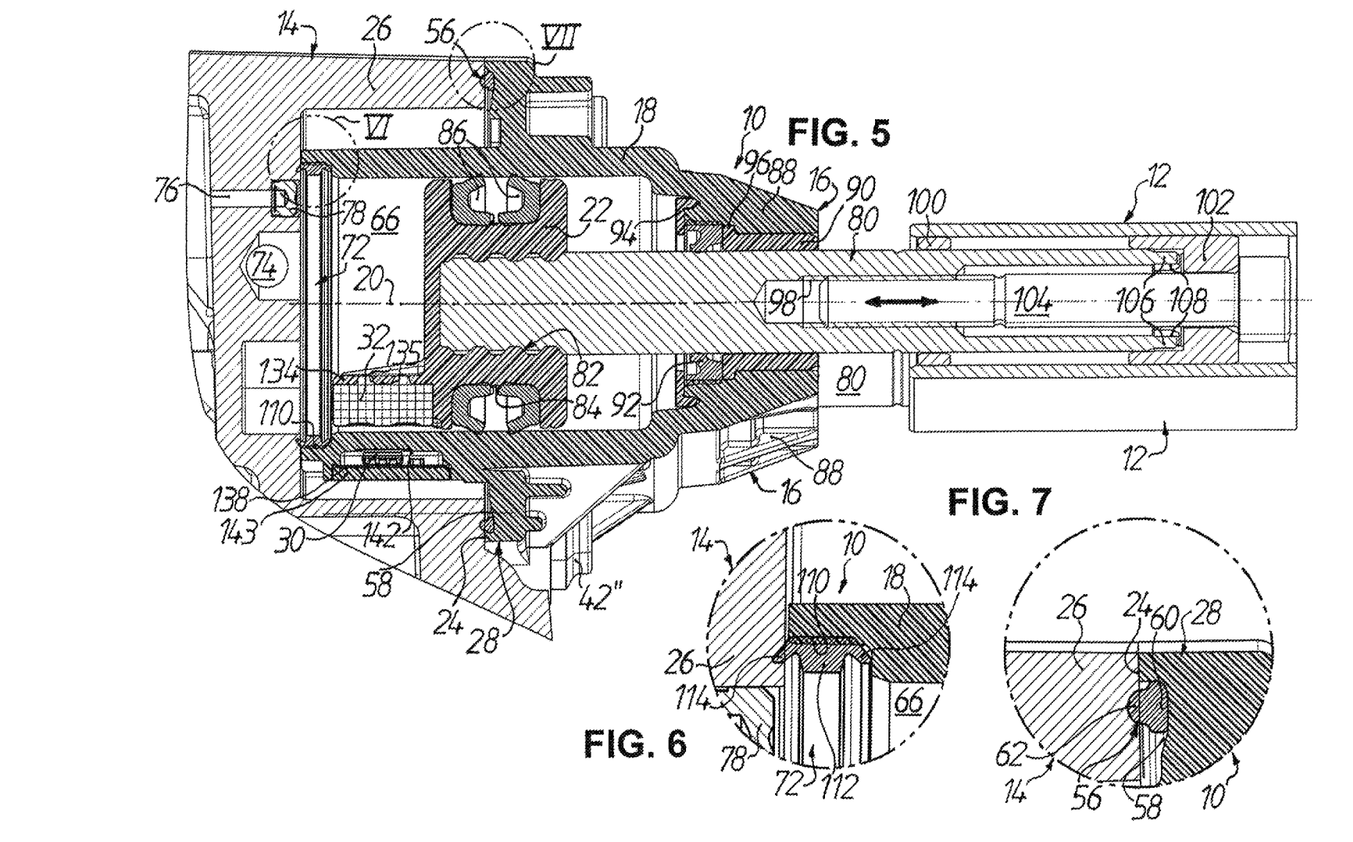
FIG. 5 shows a broken-away sectional view to enlarged scale of the actuating device according to FIG. 1 in mounted state in correspondence with the section line V-V in FIG. 3, wherein the section plane extends along a cylinder axis of one of the actuating cylinders of the actuating device, and on the side on the right in FIG. 5 there is illustrated by way of example the coupling of a selector rod, as setting element, of the motor vehicle transmission to a piston rod of the actuating cylinder.
FIG. 6 shows a view, which is increased in size by comparison with the scale of FIG. 5, of the detail VI in FIG. 5, for clarification of a first variant of pressure seals at a cylinder chamber section of the actuating cylinder.
FIG. 7 shows a view, which is increased in size by comparison with the scale of FIG. 5, of the detail VII in FIG. 5, for illustration of a flange seal at the flange surface of the actuating device, the flange surface being formed at a flange plate of the actuating device.
Figure 8:
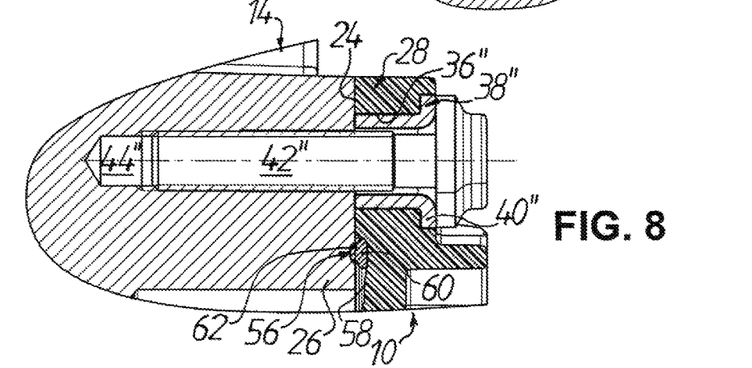
FIG. 8 shows a broken-away sectional view to enlarged scale of the actuating device according to FIG. 1 in mounted state in correspondence with the section line VIII-VIII in FIG. 3, for exemplifying illustration of further mounting points of the actuating device at the transmission casing.
Figures 13, 14:
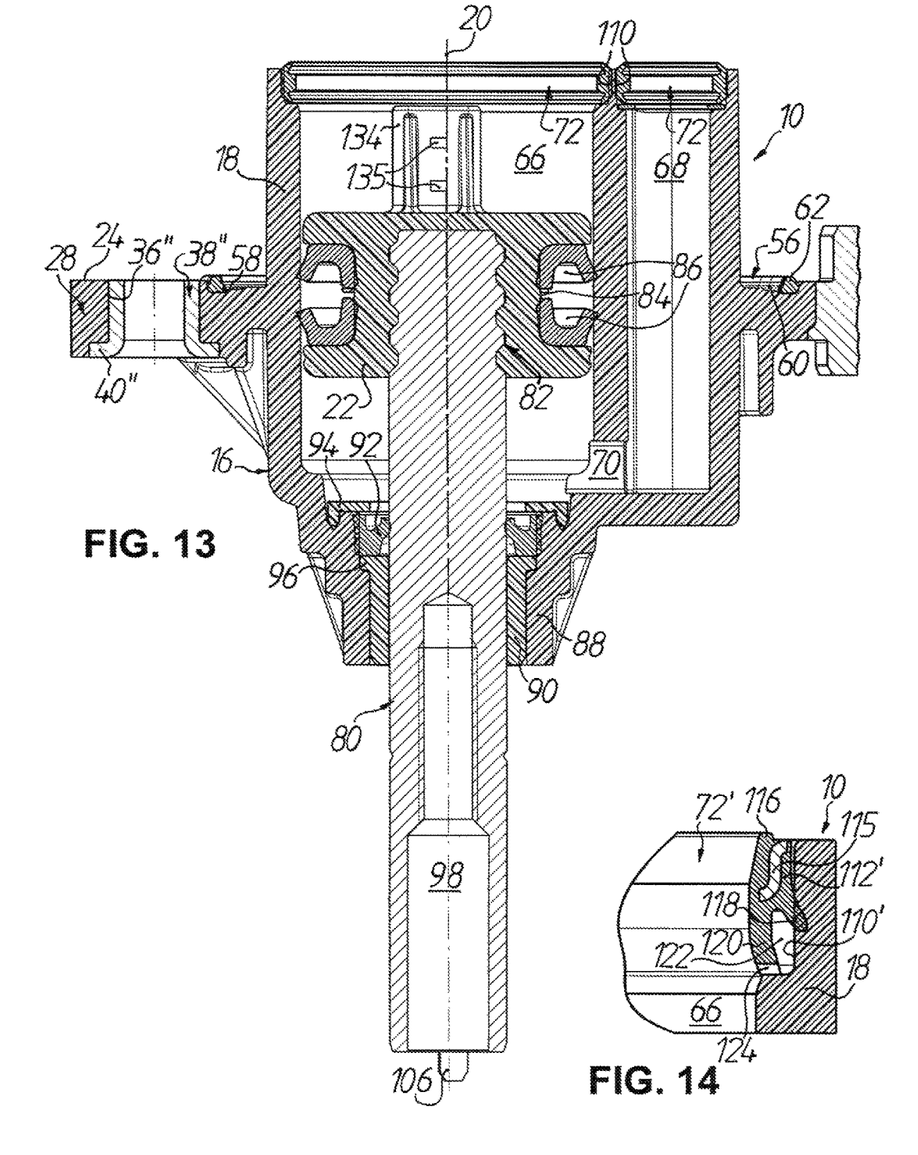
FIG. 13 shows a broken-away sectional view to enlarged scale of the actuating device according to FIG. 1 in correspondence with the section line XIII-XIII in FIG. 10, for illustration of further details of the actuating cylinders of the actuating device in an actuating cylinder sectional plane extending perpendicularly to the actuating cylinder section plane of FIG. 5.
FIG. 14 shows a sectional view, which is broken away to the left and below and which is to enlarged scale, of an actuating device with a section course corresponding with the section line XIV-XIV in FIG. 10, for illustration of a second variant, which differs from the first variant according to FIG. 6, of the pressure seals at the actuating cylinders.
Figures 19, 20:
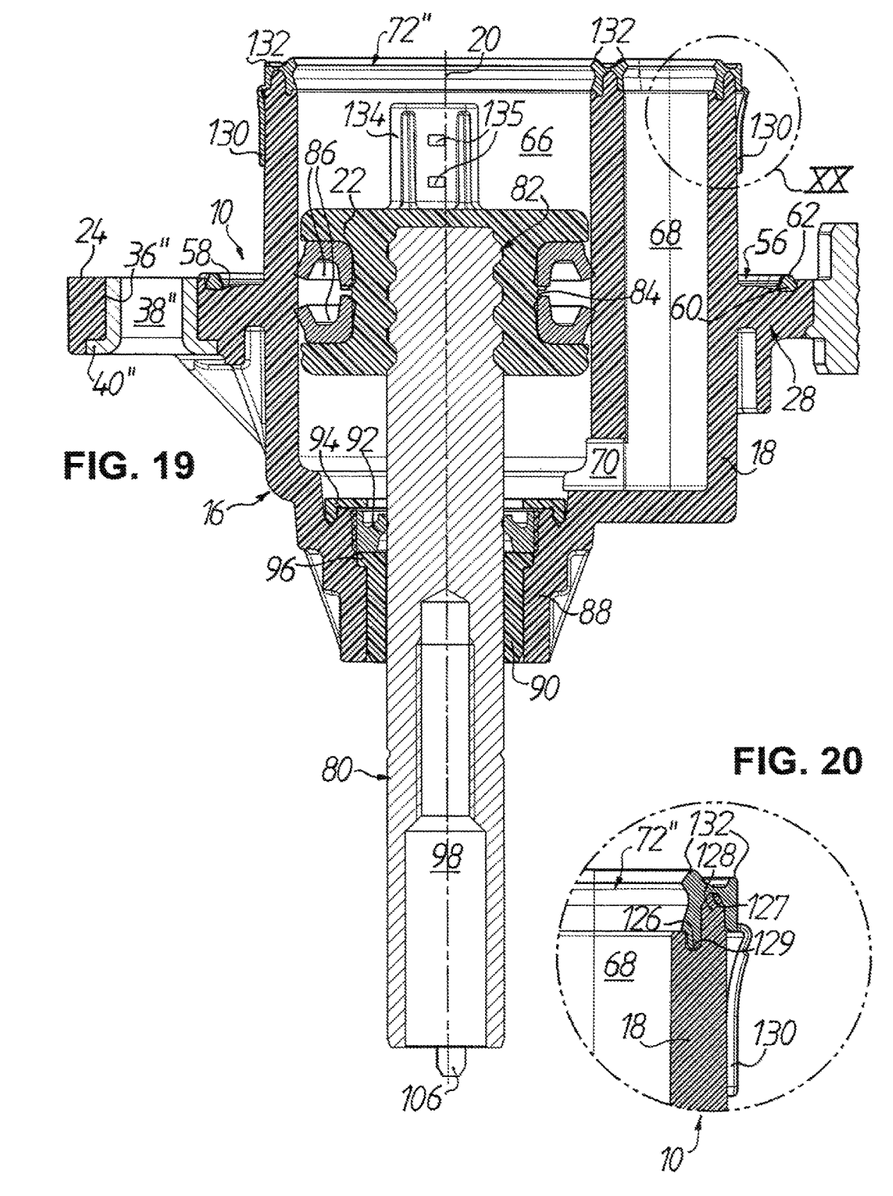
FIG. 19 shows a sectional view, which corresponds with respect to the section course of FIG. 13, of the actuating device in non-mounted state, for further illustration of the mounted pressure seals in accordance with the third variant according to FIG. 18.
FIG. 20 shows a view, which is increased in size by comparison with the scale of FIG. 19, of the detail XX in FIG. 19.

Further details of the actuating cylinders 16, which protrude by the cylinder housings 18 thereof on both sides from the flange plate 28, can be inferred from, in particular, FIGS. 5, 13 and 19. Accordingly, each cylinder housing 18 has a cylinder chamber section 66 for reception of the respective actuating piston 22 and—as can be best seen in FIGS. 13 and 19—a pressure connecting section 68, which extends parallel to the cylinder chamber section 66 and which is in fluid connection with the cylinder chamber section 66 behind the actuating piston 22, as seen from the side of the flange surface 24, by way of a channel 70 extending transversely to the cylinder axis 20. The cylinder chamber sections 66 and the pressure connecting sections 68 of the actuating cylinders 16 are respectively provided at the open ends thereof, which are spaced from the flange surface 24, with a pressure seal 72, 72', 72", which as shown in FIG. 5 seals relative to the partition wall 26 of the transmission casing 14 and which will be described in different variants in the following. As a result, the respective actuating piston 22 can be loaded with pressure on one (circular-surface) side thereof by way of the open end of the cylinder chamber section 66 and on the other (annular-surface) side thereof by way of the open end of the pressure connecting section 68. In FIG. 5 the pressure connection, which is needed for that purpose at the open end of the cylinder chamber section 66, in the partition wall 26 of the transmission casing 14 is schematically illustrated at 74; however, the further pressure connection, which is provided at the open end of the pressure connecting section 68, in the partition wall 26 of the transmission casing 14 is not shown. A bleed channel 76, with a bleed stop 78, for bleeding the actuating cylinder 16 towards the control side is indicated in FIG. 5.

According to FIGS. 5, 13 and 19 the actuating piston 22 similarly is made from a plastic material, for example polyphthalamide (PPA) with a predetermined glass-fiber component of, for example, 50%, which is injection-molded by injection-molding onto a piston rod 80 of light metal, such as, for example, an aluminum alloy, to provide a mechanically positive couple, for which purpose the piston rod 80 is provided at the end of the outer circumference with a profiled portion 82. The actuating piston 22 has at the outer circumferential side a wide annular groove 84 in which two elastomeric groove rings 86 are mounted in such a manner, which is known per se, that the sealing lips thereof face one another. The groove rings 86 co-operate in sealing manner with the inner wall of the cylinder chamber section 66 so as to separate the end-face effective surfaces of the actuating piston 22 from one another and in that case to make possible a pressure difference at the actuating piston 22 and thus a displacement of the actuating piston 22.

As can be best seen in FIGS. 1, 5, 13 and 19, each cylinder housing 18 is integrally formed at an end, which protrudes beyond the flange plate 28 on the side remote from the flange surface 24, with an externally ribbed housing projection 88 for reception of a guide bushing 90 of a plastic material such as, for example, polyphenylenesulfide (PPS), in which the piston rod 80 connected with the respective actuating piston 22 is axially guided. Moreover, a rod seal 92 sealingly co-operating with the piston rod 80 and connected with the guide bushing 90 in axial direction towards the actuating piston 22 is received in the housing projection 88. An annular cover 94 of a plastic material, such as the plastic material of the cylinder housing 18, mounted on the housing projection 88 by ultrasonic welding secures not only the guide bushing 90, which bears by an annular collar 96 against a step in the housing projection 88, but also the rod seal 92 in the housing projection 88.

According to FIG. 5 the selector rod 12, which is tubular in the illustrated embodiment, is mounted on the end, which protrudes beyond the housing projection 88 in a direction away from the flange plate 28, of the piston rod 80, for which purpose the piston rod 80 has a threaded bore 98 formed at the end. Two annular metallic guide parts 100, 102 are attached, for example welded, in the selector rod 12 at an axial spacing, by way of which guide parts the selector rod 12 is pushed onto the piston rod 80 substantially free of radial play. A cap screw 104 passing through the guide part 102 on the right in FIG. 5 is screwed into the threaded bore 98 of the piston rod 80 so as to connect the selector rod 12 and piston rod 80 together in tension-resistant and compression-resistant manner. In that case, projections 106 provided at the free end of the piston rod 80 and projecting along the cylinder axis 20 engage in associated recesses 108, which are of substantially complementary shape as seen in circumferential direction, of the guide part 102 on the right in FIG. 5 so as to secure the piston rod 80 and thus the actuating piston 28 against turning in the cylinder housing 18 at the selector fork (not shown), which is fastened to the selector rod 12 and suitably supported. To that extent it is apparent that the selector rod 12 can be displaced to the right or left in FIG. 5 (see the double arrow) depending on the pressure loading of the actuating piston 22 or held in a specific axial setting, in which case the sensor 30 and the signal element 32 always remain in congruence as a consequence of the securing of the actuating piston 22 in the cylinder housing 18 against rotation.

Details with respect to the already-mentioned different variants of the elastomeric—for example formed from an elastomer on the basis of acrylonitrile-butadiene-styrene rubber (NBR)—pressure seals 72, 72', 72" can be inferred from FIGS. 5, 6, 13 and 16 (first variant), 14 (second variant) and 18 to 20 (third variant).

In the first and second variants of the pressure seals 72, 72' the cylinder chamber section 66 and pressure connecting section 68 of the cylinder housings 18 are each provided at the open ends thereof with an annular recess 110, 110' for reception of the associated pressure seal 72, 72', which is constructed to amplify the sealing action under pressure loading and which in both cases has an annular base body 112, 112'. In the first variant of the pressure seal 72 there is formed, as FIG. 6 in particular shows, on both longitudinal sides of the base body 112 an encircling sealing lip 114 which under radial pressure loading bears against the adjacent end surface in the annular recess 110 of the cylinder housing 18 or against the partition wall 26 of the transmission casing 14 in order to seal in axial direction.

By contrast, according to FIG. 14 in the second variant of the pressure seal 72' the annular base body 112', which is stiffened by an annular reinforcement 115 vulcanized in place, is provided on a longitudinal side with a sealing bead 116, which protrudes beyond the respective open end of the cylinder chamber section 66 or of the pressure connecting section 68 and which is annular as seen in plan view and spherical as seen in cross-section. On the other longitudinal side of the base body 112', a radially acting sealing lip 118 is formed radially outwards and, together with a radially inner base body projection 120 extending in axial direction, bounds an annular chamber 122 which can be loaded with pressure by way of radially extending passages 124 in the base body projection 120 so as to press the pressure seal 72' by its sealing bead 116 in the manner of an annular piston against the partition wall 26 of the transmission casing 14. To that extent it is common to these two variants of the pressure seals 72, 72' that they are basically suitable under pressure loading to bridge over any axial gaps, which may be present, in problem-free manner and with sealing effect.

Figure 18:
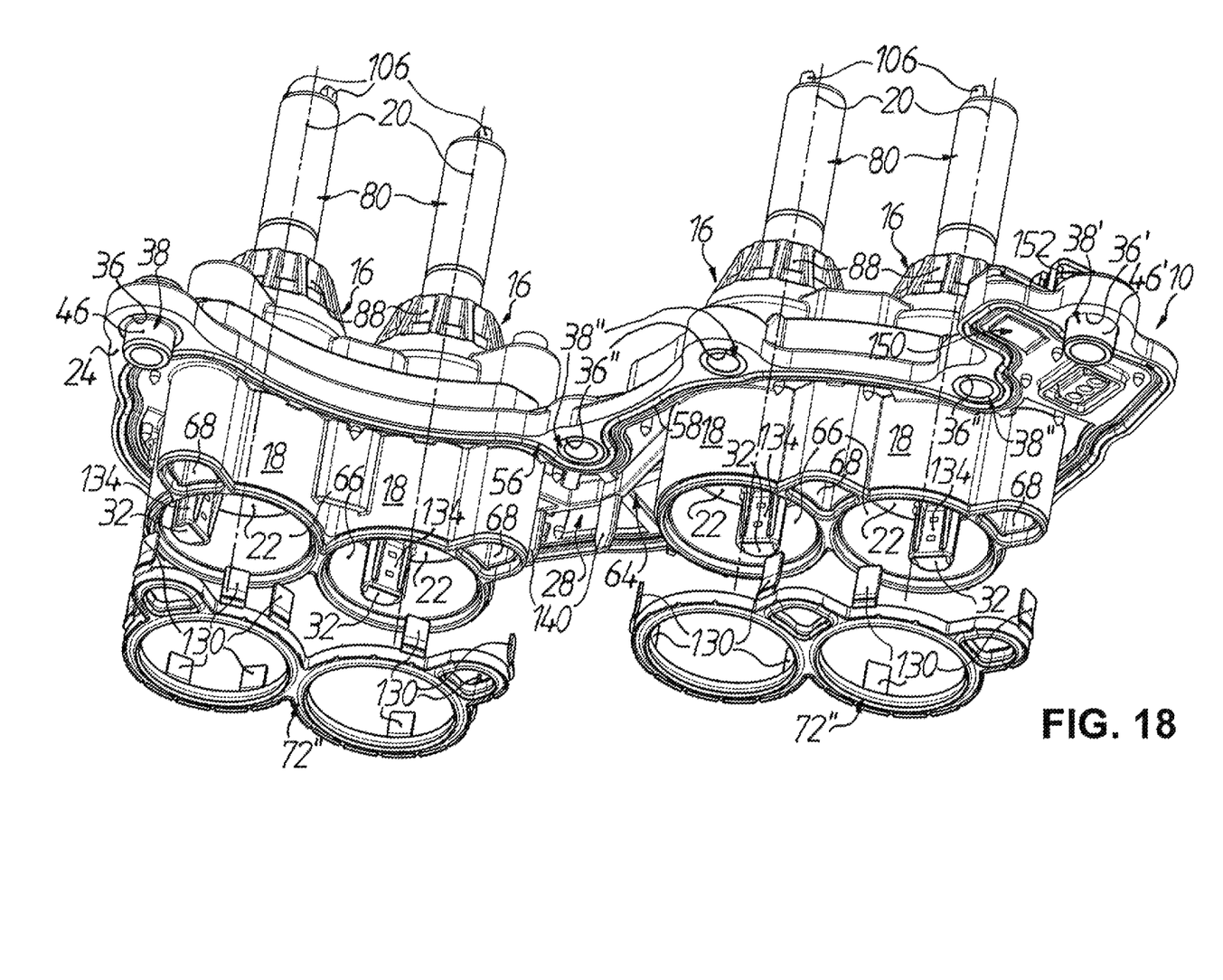
FIG. 18 shows a perspective exploded illustration of an actuating device in non-mounted state obliquely from above and behind with a view onto the flange surface, for illustration of actuating cylinder pressure seals in accordance with a third variant of the pressure seals differing from the variants of FIGS. 6 and 14.

In the third variant, which is illustrated in FIGS. 18 to 20, of the pressure seals 72" at least the pressure seals at the open ends of the cylinder chamber section 66 and the pressure connecting section 68 of each cylinder housing 18—in the embodiment of FIG. 18 even all pressure seals, which are at the partition wall side, of each two cylinder housings 18—are combined in assembly-friendly manner to form a shaped seal which is constructed to be able to be plugged onto the open ends. For that purpose, axial grooves 126 and 127 are formed at the open ends of the cylinder housings 18 and at the pressure seals 72" respectively, into which grooves axially protruding webs 128 or 129 at the respective other part are insertable. Straps 130 integrally formed externally at the pressure seal 72" serve in this embodiment for securing against loss of the respective pressure seal 72" in the unmounted state of the actuating device 10, the straps 130 being fastened to the outer circumference of the cylinder housings 18 by a suitable adhesive. In the state of mounting of the actuating device 10 in or on the transmission casing 14, sealing lips 132 provided at the end face at the pressure seals 72" seal relative to the partition wall 26 of the transmission casing 14 and hold the respective pressure seal 72" in position.

It was already discussed in the introduction that the axial actuating movements able to be produced by the actuating cylinders 16 of the actuating device 10 independently of one another are sensed in terms of stroke, for which purpose a sensor 30 and signal element 32 are associated with each actuating cylinder 16. In the illustrated embodiments each actuating piston 22 is provided, for this purpose and as can be best seen in FIGS. 5, 16 and 17, at the edge of its end surface with a sensing projection 134, which is integrally formed at the time of injection-molding the actuating piston 22 and on which a magnet as a signal element 32 is mounted by plastic-material injection-molded encapsulation or attachment. The magnet is in that case formed by NdFeB particles which are bound by a plastic material, for example polyphenylenesulfide (PPS), to form a "magnet mass" capable of injection molding. During injection-molding, this mass flows into recesses 135 and undercuts 136 provided at the sensing projection 134 (see FIGS. 5, 13, 16, 17 and 19) so that the signal element 32 as a result is captively secured to the actuating piston 22 by mechanically positive coupling.

So far as the attachment of the sensor 30 to the respective cylinder housing 18 is concerned, two alternatives are shown in the figures by way of example, to which it is common that the sensors 30—here Hall elements—are mounted on a thin flexible circuit board 138, for example on the basis of polyimide films, by way of which the sensors 30 are in signal connection with the electrical interface 34. The flexible circuit board 138 is placed on the side of the flange surface 24 of the unit—thus protected in the partition wall 26 of the transmission casing 14—to follow the outer contour of the cylinder housing 18, as can be best seen in FIGS. 2, 10 and 17 (the flexible circuit board is not depicted in FIG. 18). In that case, tongues 140 for holding and guiding the flexible circuit board 138 are formed integrally at the flange plate 28 and adjacent to the cylinder housings 18.

Figure 2:
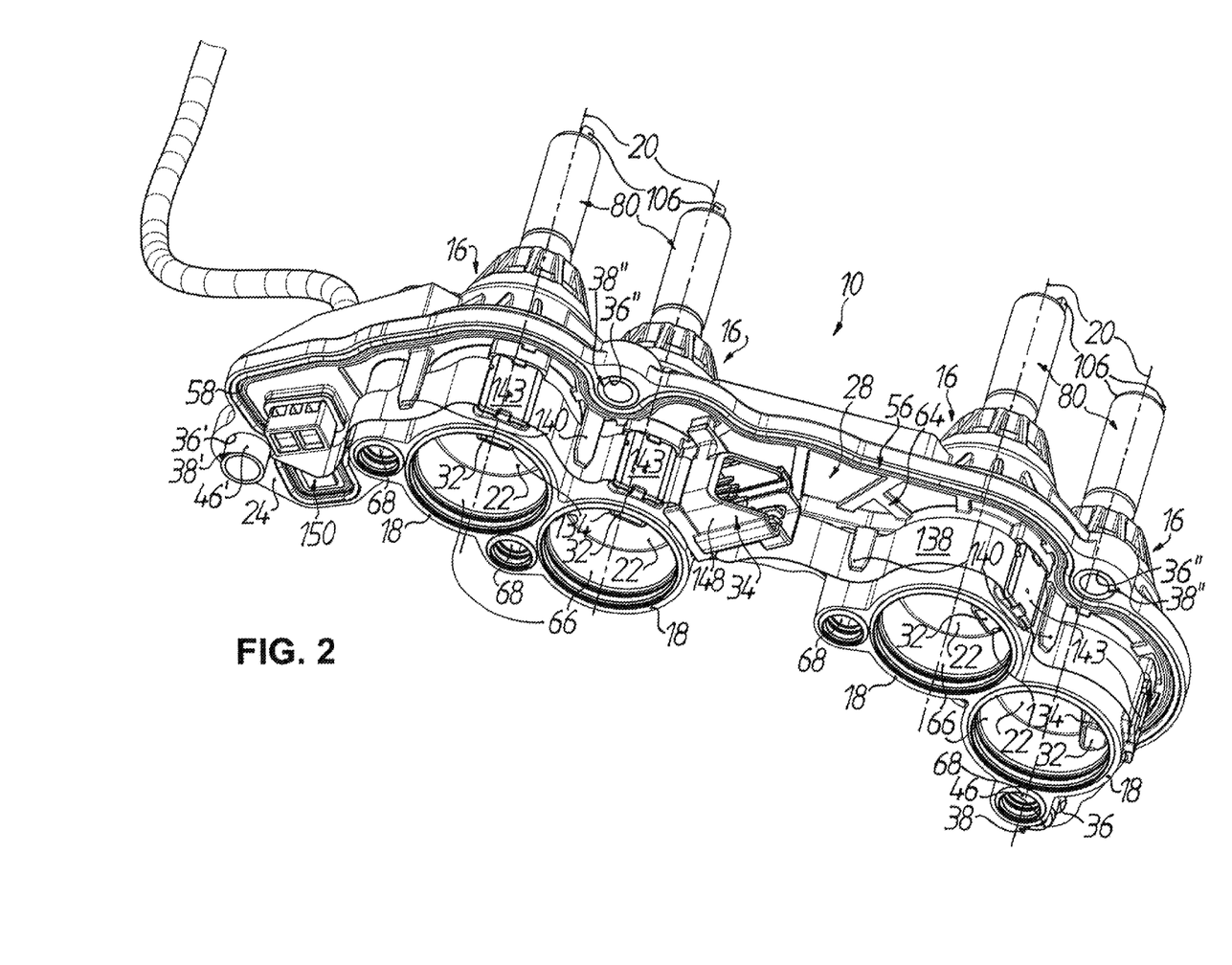
FIG. 2 shows a perspective view of the actuating device according to FIG. 1 in non-mounted state obliquely from below and behind with a view onto the flange surface of the actuating device, by way of which the actuating device can be flange-mounted on a partition wall of a transmission casing of the motor vehicle transmission.
Figure 3:
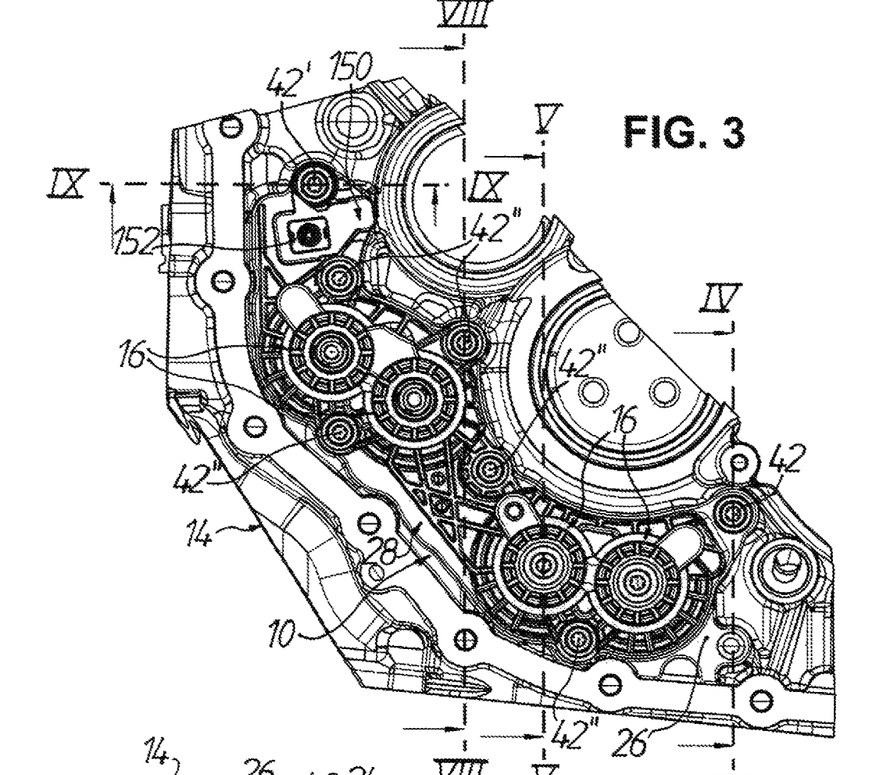
FIG. 3 shows a front view, which is reduced in size by comparison with the scale of FIGS. 1 and 2, of the actuating device according to FIG. 1, in a state of being mounted on a transmission casing, which is illustrated in broken-away form.

According to, in particular, FIGS. 2, 5 and 10 in the case of the first sensor alternative each cylinder housing 18 is now provided at the outer circumference with a receiving recess 142 for the associated sensor 30. The flexible circuit board 138 is equipped on one side with the sensors 30 and carries on the other side, in the region of the sensors 30, covers 143 of plastic material, which are, for example, glued to the flexible circuit board 138 and serve the purpose of protectively closing the receiving recesses 142 with the sensors 30 received therein. In the illustrated embodiment, the covers 143 are laser-welded to the respective cylinder housing 18.

Figures 15, 16, 17:
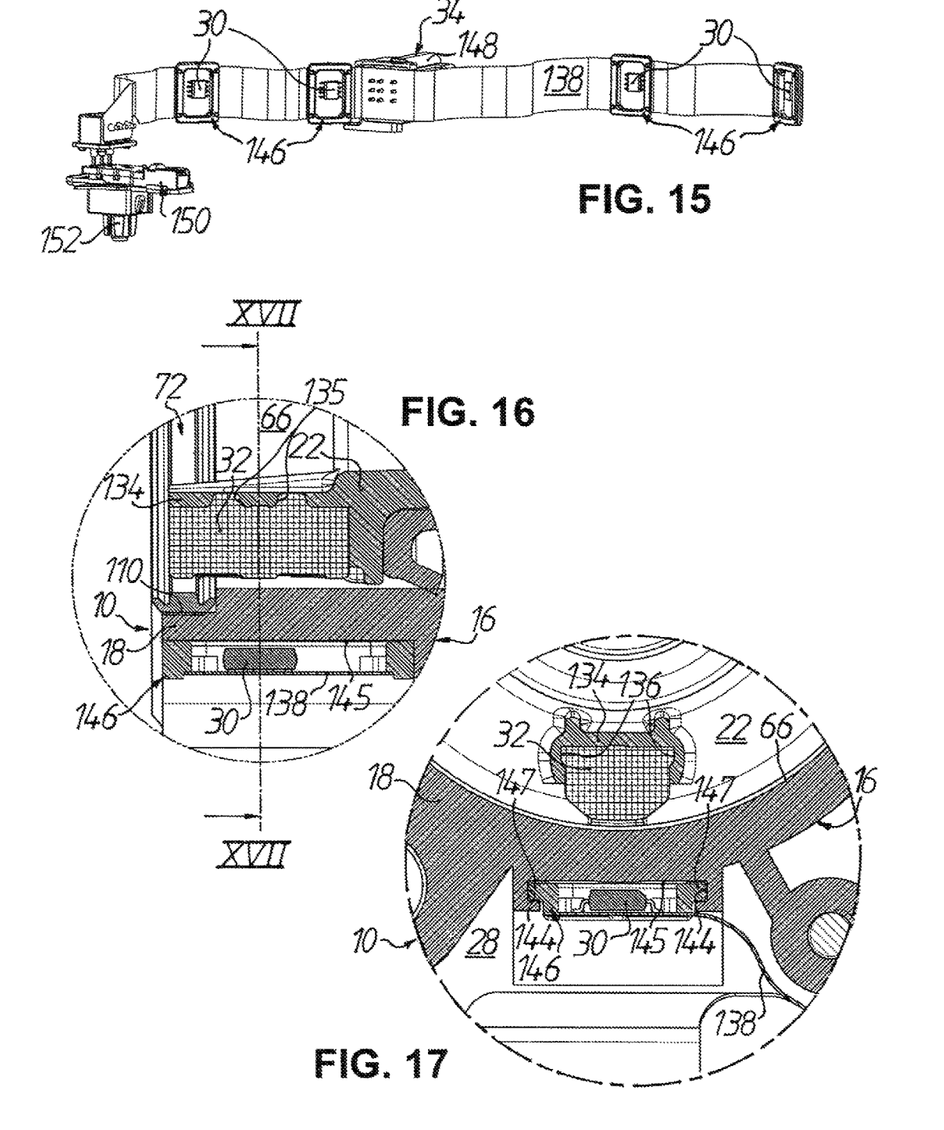
FIG. 15 shows a perspective view of a flexible circuit board, which is equipped on one side with sensors and (plug-in) frames for attaching to an actuating device, of an integrated sensor system of the actuating device, in non-mounted state, as an alternative to the flexible circuit board, which is shown in mounted state in FIGS. 2, 5 and 10, of the sensor system, which by contrast to the flexible circuit board of FIG. 15 is equipped on opposite sides with sensors and (closure) covers.
FIG. 16 shows a broken-away sectional view, which corresponds with respect to the section course in the actuating cylinder of FIG. 5, of the non-mounted actuating device in the end region of the actuating cylinder, which is closest to the fixed bearing mounting point, with mounted flexible circuit board of FIG. 15.
FIG. 17 shows a broken-away sectional view of the actuating device in correspondence with the section line XVII-XVII in FIG. 16.

In the case of the second sensor alternative shown in FIGS. 15 to 17, each cylinder housing 18 has at the outer circumference a receiving section 145, which is laterally bounded by two parallel and mutually facing longitudinal grooves 144, for the associated sensor 30. The sensors 30 fitted onto the flexible circuit board 138 are each surrounded on one and the same side of the flexible circuit board 138 by a respective frame 146, which is encapsulated together with the respective sensor 30 and the flexible circuit board 138 by a sealing material not able to be seen in the figures, for example a one-component epoxy resin thermally hardened or hardened by ultraviolet light. The frame 146 has on mutually remote sides two parallel webs 147 which extend transversely to the flexible circuit board 138 and which are insertable into the longitudinal grooves 144 at the receiving section 145 of the respective cylinder housing 18 so as to mechanically positively fix the associated sensor 30 thereat. In both sensor variants the sensor 30 is thus arranged as closely as possible to the respective signal element 32 to be detected.

The electrical interface 34 similarly pre-fitted onto the fixable circuit board 138 is otherwise fastened in accordance with FIGS. 2 and 10 by its plastic material housing 148 to the flange plate 28 and one of the cylinder housings 18 by laser welding.

Figure 1:
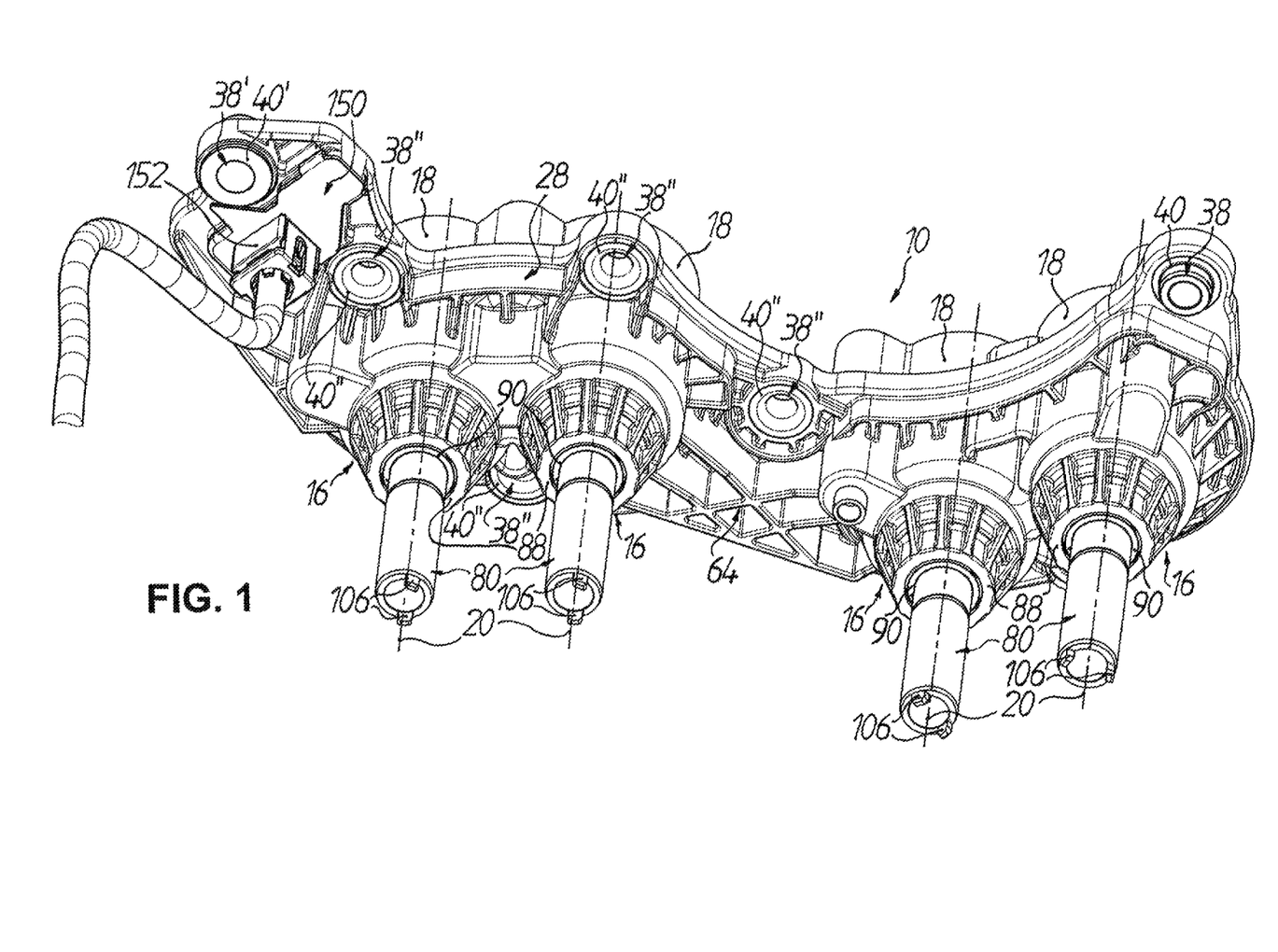
FIG. 1 shows a perspective view of a hydraulic actuating device for actuation of setting elements in a motor vehicle transmission according to a preferred embodiment of the invention, in non-mounted state obliquely from above and the front with a view onto the side of the actuating device remote from a flange surface of the actuating device.

Finally, it is also indicated in FIGS. 1 to 3, 10, 15 and 18 that a sensor 150, for example a Hall element, for rotational speed sensing at the motor vehicle transmission and/or a terminal 152 for such a sensor (not shown)—the cable illustrated in FIGS. 1 and 2 leads to this—is or are integrated in the unit, more precisely in the flange plate 28, and for the common contact-making can similarly be in signal connection with the electrical interface 34 by way of the flexible circuit board 138. For mounting of the actuating device 10 in the motor vehicle transmission it is then only necessary to insert a plug into the electrical interface 34 in order to electrically connect all sensors with the transmission control.

A hydraulic actuating device for actuation of setting elements in a motor vehicle transmission comprises at least two actuating cylinders, which each comprise a cylinder housing and an actuating piston, which is guided therein to be longitudinally displaceable along a cylinder axis and which can be acted on hydraulically and is operatively connected with one of the setting elements. The actuating cylinders are combined to form a unit, which can be flange-mounted by way of a flange surface from one side on a partition wall of a transmission casing of the motor vehicle transmission. For that purpose, the cylinder housings are injection-molded integrally with a flange plate, which extends transversely to the cylinder axes, of a plastic material on which the flange surface is formed. In that case the cylinder housings project in the direction of the cylinder axes at least on the side of the flange surface beyond the flange plate so that the requirement of the actuating device for installation space in or at the transmission casing is small.

Variations and modifications are possible without departing from the scope and spirit of the present invention as defined by the appended claims.

The invention claimed is:

1. A hydraulic actuating device for the actuation of setting elements in a motor vehicle transmission, comprising at least two actuating cylinders each having a cylinder housing and an actuating piston, which is guided in the cylinder housing to be longitudinally displaceable along a cylinder axis and which is acted on hydraulically and is operatively connected with one of the setting elements, wherein the actuating cylinders are combined to form a unit which can be flange-mounted by way of a flange surface from one side on a partition wall of a transmission casing of the motor vehicle transmission, characterized in that the cylinder housings of the actuating cylinders are integrally injection-molded with a flange plate of plastic material which extends transversely to the cylinder axes and at which the flange surface is formed, wherein the cylinder housings project beyond the flange plate in the direction of the cylinder axes at least on the side of the flange surface.

2. A hydraulic actuating device according to claim 1, characterized in that the flange plate is provided with a plurality of mounting holes, which are distributed over a circumference wherein two of the mounting holes farthest from one another are two end mounting holes and the plurality of mounting holes extend perpendicularly to the flange surface, and which are lined with support sleeves, the sleeves being provided on a side remote from the flange surface with a tensioning collar for fastening screws which extend through the support sleeves and which said fastener screws are able to be screwed into associated threaded bores of the partition wall of the transmission casing so as to draw the flange surface against the partition wall for mounting of the actuating device.

3. A hydraulic actuating device according to claim 2, characterized in that the two end mounting holes form a fixed bearing mounting hole and a movable bearing mounting hole at which the support sleeves project beyond the flange surface by centering projections for mechanically positive engagement in associated centering recesses in the partition wall of the transmission casing, whereas the remaining support sleeves end in front of or at the flange surface, wherein the fixed bearing mounting hole surrounds the associated support sleeve free of play, but the movable bearing mounting hole is formed as an oblong hole which is aligned with the fixed bearing mounting hole and in which the associated support sleeve is movably received in correspondence with the alignment of the oblong hole so that compensation is provided for tolerances in spacing.

4. A hydraulic actuating device according to claim 3, characterized in that the flange plate is provided, on the side remote from the flange surface, around the movable bearing mounting hole with a chamfer which allows deflection of the tensioning collar at each support sleeve, which is associated with the movable bearing mounting hole, before the support sleeves come into contact by an end surface with a respective abutment surface provided in the associated centering recess.

5. A hydraulic actuating device according to claim 1, characterized in that the flange plate is provided in the region of the flange surface with an encircling depression for reception of a flange seal which comprises a wider base section serving as a captive anchorage at the flange plate, and a thinner sealing section, which is arranged on the wider base section and projects beyond the flange surface, said thinner sealing section made from resilient sealing material and coated in two layers.

6. A hydraulic actuating device according to claim 1, characterized in that each cylinder housing has a cylinder chamber section for reception of the respective actuating piston and a pressure connecting section which extends parallel to the cylinder chamber section and is in fluid connection behind the actuating piston with the cylinder chamber section, the wider base sections each being provided at an open end thereof spaced from the flange surface with a respective pressure seal sealing relative to the partition wall of the transmission casing so the actuating piston is able to be loaded with pressure on one side thereof by way of the open end of the cylinder chamber section and on the other side thereof by way of the open end of the pressure connecting section.

7. A hydraulic actuating device according to claim 6, characterized in that the cylinder chamber sections and pressure connecting sections are each provided at the open end thereof with an annular recess for reception of the associated pressure seal, which is constructed to amplify the sealing action under pressure loading, wherein the pressure seal has an annular base body which either is provided on both longitudinal sides with a sealing lip sealing under radial pressure loading in axial direction or is provided on one longitudinal side with a sealing bead protruding beyond the respective open end while on the other longitudinal side a radially acting sealing lip is provided which together with a base body projection bounds an annular chamber able to be loaded with pressure by way of radially extending passages in the base body projection so as to press the pressure seal by its sealing bead in the manner of a piston against the partition wall.

8. A hydraulic actuating device according to claim 6, characterized in that at least the pressure seals at the open ends of the cylinder chamber section and the pressure connecting section of each cylinder housing are combined to form a shaped seal which is constructed so as to be able to be plugged onto the open ends.

9. A hydraulic actuating device according to claim 1, characterized in that each cylinder housing is provided at an end which projects beyond the flange plate on the side remote from the flange surface, with a housing projection for reception of a guide bushing, in which a piston rod connected with the respective actuating piston is guided.

10. A hydraulic actuating device according to claim 9, characterized in that a rod seal co-operating with the piston rod and adjoined to the guide bushing in axial direction is also received in the housing projection, wherein an annular cover mounted on the housing projection secures both the guide bushing and the rod seal in the housing projection.

11. A hydraulic actuating device according to claim 1, characterized in that a sensor for positional detection of a signal element mounted on the respective actuating piston is associated with each cylinder housing, wherein an electrical interface which is in signal connection with the sensors and by way of which the sensors are contacted in common is integrated in the unit.

12. A hydraulic actuating device according to claim 11, characterized in that one of a sensor for rotational speed sensing at the motor vehicle transmission and a terminal for said sensor, for rotational speed sensing is integrated in the unit and disposed in signal connection with the electrical interface for the common contact-making.

13. A hydraulic actuating device according to claim 12, characterized in that the sensors are in signal connection by way of a flexible circuit board which is placed on the side of the flange surface of the unit to follow an external contour of the cylinder housings.

14. A hydraulic actuating device according to claim 13, characterized in that each cylinder housing has at an outer circumferential side thereof a receiving recess for a respective sensor, wherein the flexible circuit board on one side is equipped with the sensors and on the other side carries in the region of the sensors covers serving the purpose of protectively closing the receiving recesses with a respective sensor received in a respective receiving recess.

15. A hydraulic actuating device according to claim 13, characterized in that each cylinder housing has at the outer circumferential side a receiving section, which is laterally bounded by two parallel longitudinal grooves facing one another, for a respective sensor, wherein each sensor fitted to the flexible circuit board is surrounded on one and the same side of the flexible circuit board by a frame which is encapsulated together with a respective sensor and the flexible circuit board by a sealing material and has on mutually remote sides two parallel webs which extend transversely to the flexible circuit board and which are insertable into the longitudinal grooves at the receiving section of the respective cylinder housing so as to fix the associated sensor.

16. A hydraulic actuating device according to claim 15, characterized in that tongues for holding and guiding the flexible circuit board are integrally formed on the flange plate adjacent to the cylinder housings.

17. A hydraulic actuating device according to claim 16, characterized in that each of the actuating pistons is provided with a sensing projection on which a magnet as the signal element is mounted by injection-molded encapsulation by plastic material.

18. A hydraulic actuating device according to claim 13, characterized in that tongues for holding and guiding the flexible circuit board are integrally formed on the flange plate adjacent to the cylinder housings.

19. A hydraulic actuating device according to claim 11, characterized in that each of the actuating pistons is provided with a sensing projection on which a magnet as the signal element is mounted by injection-molded encapsulation by plastic material.

20. A hydraulic actuating device according to claim 11, characterized in that the sensors are in signal connection by way of a flexible circuit board which is placed on the side of the flange surface of the unit to follow an external contour of the cylinder housings.

* * * * *